(12) United States Patent
Woydt

(10) Patent No.: US 8,002,469 B2
(45) Date of Patent: Aug. 23, 2011

(54) TRIBOMATERIALS FOR AXIAL AND RADIAL FOIL BEARINGS

(75) Inventor: Mathias Woydt, Berlin (DE)

(73) Assignee: BAM, Berlin (DE)

( * ) Notice: Subject to any disclaimer, the term of this patent is extended or adjusted under 35 U.S.C. 154(b) by 627 days.

(21) Appl. No.: 11/575,443

(22) PCT Filed: Sep. 9, 2005

(86) PCT No.: PCT/EP2005/009847
§ 371 (c)(1),
(2), (4) Date: Jun. 11, 2007

(87) PCT Pub. No.: WO2006/029827
PCT Pub. Date: Mar. 23, 2006

(65) Prior Publication Data
US 2007/0292056 A1 Dec. 20, 2007

(30) Foreign Application Priority Data
Sep. 17, 2004 (DE) .......................... 10 2004 046 320

(51) Int. Cl.
*F16C 33/10* (2006.01)
(52) U.S. Cl. ....... 384/13; 384/907.1; 384/913; 428/472; 428/698
(58) Field of Classification Search .................. 384/103, 384/241, 625, 913, 907.1; 427/328–329, 427/992; 428/472, 457, 697–698, 701–702; 148/421; 423/598
See application file for complete search history.

(56) References Cited

U.S. PATENT DOCUMENTS

| | | | |
|---|---|---|---|
| 4,435,839 A | 3/1984 | Gu et al. | |
| 4,902,535 A * | 2/1990 | Garg et al. | 427/328 |
| 5,248,352 A * | 9/1993 | Nakahara et al. | 148/421 |
| 5,468,278 A * | 11/1995 | Nakahara et al. | 75/236 |
| 6,020,072 A | 2/2000 | Woydt et al. | |
| 6,126,793 A * | 10/2000 | Sugiyama et al. | 427/527 |
| 6,203,895 B1 * | 3/2001 | Berger et al. | 384/913 |
| 6,231,956 B1 * | 5/2001 | Brenner et al. | 427/534 |
| 6,888,274 B2 * | 5/2005 | Woydt et al. | 310/81 |
| 2004/0136898 A1 | 7/2004 | Berger et al. | |

FOREIGN PATENT DOCUMENTS

| | | |
|---|---|---|
| DE | 196 51 094 | 6/1998 |
| DE | 101 10 448 | 9/2002 |
| JP | 55-97449 A * | 7/1980 |
| JP | 55-134152 A * | 10/1998 |

* cited by examiner

*Primary Examiner* — Marcus Charles
(74) *Attorney, Agent, or Firm* — Fay Kaplun & Marcin, LLP

(57) ABSTRACT

A tribosystem for radial and axial foil bearings includes a first structural component part; and a second structural component part interacting with the first part. The first and second parts are in a dry frictional unidirectional sliding contact with one another until an air film is formed. A surface of at least one of the first and second parts being exposed to the dry frictional contact contains at least partly at least one of a metallic bound (Ti,Mo)(C,N), $Ti_{n-2}Cr_2O_{2n-1}$ with $6 \leq n \leq 9$ and solid solution of $TiO_2$—$Cr_2O_3$.

19 Claims, 3 Drawing Sheets

TRIBOMATERIALS FOR AXIAL AND RADIAL FOIL BEARINGS

FIELD OF INVENTION

This present invention relates to the application of sliding materials in axial and radial foil bearings.

BACKGROUND INFORMATION

Leaf- or bump-type foil air bearings are self-acting, compliant surface bearings. When in operation, they support load on an air film. Benefits of foil air bearings include reduced cost, higher speed, lower weight, higher efficiency and greater accommodation for misalignment and distortion. During start-up and shutdown, however, unlubricated dry high-speed sliding contact occurs between e.g. the shaft and foil surfaces, causing wear, until the air film was formed. The lift-off speeds depend from design and diameter, but range typically from 8 m/s to 15 m/s. A wear resistant coating is therefore required for durable, long-term operation. They accumulate up to 100,000 starts and stops.

The foils thicknesses are below 200 µm and a wear loss of 25% of this thickness is only tolerable otherwise the damping characteristics change. Additional, the use of coated shafts in air foil bearings is considered to be necessary, since special shaft super-alloys like, INX-750, René41, INC909 or MA956 tend at 800° C. to adhesive (Literature 1) material transfer, when sliding unlubricated against INX-750.

The substitution of chromium carbide (U.S. Pat. No. 5,034, 187) in the NASA PS200-series self-lubricating coating based on 30%-70% chromium carbide, 5%-20% soft and nobles (Ag) metals, 5%-20% fluorides and 20%-60% metallic binder by chromium oxides leading to the NASA PS300 series (U.S. Pat. No. 5,866,518) generic composed of 60-80% $Cr_2O_3$, fluoride of gr. I and II, Ag, Au, Pt, Pd, Rh or Cu and NiCr binder seems to be motivated by cost and process aspects. The porosity of a sintered PM212 was 22% by volume. The NASA-series PS302 to PS321 present a binder rich (41-60 wt.-% of NiCr, ~METCO 443) concept.

The use of solid lubricant coatings composed of 20-23% $BaF_2$+13-15% $CaF_2$+33-38% $Cr_2O_3$+25-33% Ag in a heat resistant Ni-binder (23, 5Ni17Co12, 5Cr0, 5Al) was first presented by S. Niizeki et al. in literature 3, S. Niizeki, T. Yoshioka, H. Mizutani, H. Toyota, T. Hashimoto, Development of solid lubricants for high temperature rolling ceramic bearings (part I): Various solid lubricants based on fluorid compounds, Japanese Journal of Tribology, Vol. 40, No. 12, 1995, S. 1277-1287.

The wear rates for the couple INX-750/PS304 at 25° C. and 500° C. in a narrow range of 1.6-2.4 $10^{-4}$ $mm^3/Nm$ were measured in the trust-washer rig under P×V-values of 0.11-0.22 MPa×m/s by NASA.

The PV factor or P×V value is the product of bearing pressure and surface velocity traditionally expressed in (lb/$in^2$)×(ft/min) or in the ISO equivalent in Pa×m/s. It characterizes the mechanical input in a sliding bearing as severity of design or the maximum mechanical input that the tribomaterials can support. The term µPV is equivalent to the heat generated in $W/mm^2$. It describes a barrier between low wear and high wear regimes. As well as the upper value of a load-bearing materials PV product above which a material fails to function satisfactorily. High PV-values mean high load capacities of the bearing.

The world wide used wear rate or wear coefficient in $[mm^3/Nm]$ describes the wear expectation of a couple under certain operating conditions, but is not a material property. It is defined as the ratio of the wear volume divided by the acting normal force and effective sliding distance.

For definition of wear rate and PV-value, please see: ASM handbook "Friction, Lubrication and Wear Technology, volume 18, October 1992, ISBN 0-87170-380-7 or ASTM G40-01 "Standard Terminology Relating to Wear and Erosion".

U.S. Pat. No. 5,370,719 is directed to cutting inserts and displays results from milling test. They form open tribosystems. Since the normal load on the cutting edge is unknown, wear rates cannot be calculated using the wear scar width.

The patent application DE Patent No. 195 30 517 discloses also a monophasic coating composed of (Ti,Mo)(C,N) deposited on steel for cutting tools. In the common understanding of metallurgist is "steel" distinct from a super alloy based on nickel or cobalt.

The patent applications related to titanium carbonitride or titanium-molybdenum carbonitride cermets cover cutting tool inserts. Cutting tools form an open tribosystems, where the cutting tool interacts continuously with the working peace, which itself enters into contact mainly or only one time. The working peace consists consequently not of the cermets.

The foil bearing itself represents a closed tribosystems composed of two periodically interacting surfaces, which is distinct different from an open one.

DE Patent No. 195 48 718 discloses lubricious oxide (LO) coatings for the tribological stressed surfaces in liquid lubricated internal combustion engines. The LO can be deposited as coatings or form LO by tribooxidation on substrates, like (Ti,Mo)(C,N). The type of binder is not mentioned. The LOs aim to substitute extreme pressure (ep) and anti-wear (aw) additives as well as polymeric viscosity index improvers in liquid lubricants (engine oils). In consequence, these LOs run under mixed/boundary and/or hydrodynamic liquid lubrication and not under dry friction (unlubricated) or at high temperatures as in the foil bearing.

U.S. Pat. No. 6,020,072 and U.S. Pat. No. 6,017,592 disclose a dry running hinge joints for aerospace applications up to 1600° C., which operate obviously at low speeds (v<0.5 m/s) and are unable to form an aerodynamic film. Tribooxidation or static oxidation form soft reaction layers on specific materials, like (TiMo)(C,N), typically Magnélli-type phases as substoichiometric oxides forming distinct planar oxygen defects. The type of binder for use as thermal sprayed coating is not mentioned. The substrates are made of SiC, HfC and C-SiC composites. The first and second component forming the closed tribosystem (hinge joint) use the coatings disclosed in these patent applications. As coating, also $Ti_{n-2}Cr_2O_{2n-1}$ is disclosed without any data about the tribological behavior for sliding velocities above 1 m/s.

US Patent Published Application No. US2004/113520 disclose (Ti,Mo)(C,N)+8-20% Ni/Mo-binders (TM 8, 10, 20 grades of Sandvik Hard Materials) for piezoelectric high-power or vibration motors. The tribosystems in these motors perform by nature a linear, oscillating motion with strokes below 15 µm at oscillating frequencies of 20-40 kHz. The significant differences to foil bearings are the 1.000 times greater generation of frictional heat during dry sliding of foils and the fact of needing coefficient of friction greater than 0.5. The piezomotor is unable to form an aerodynamic film.

DE Patent No. 196 40 789 discloses coatings for liquid lubricated piston rings in internal combustion engines composed of 50-95% by volume (Ti,Mo)(C,N) hard phase with Ni,Co,Fe-binders, which were as example deposited using powders composed of 59.6 weight-% $TiC_{0.7}N_{0.3}$, 12.0 weight-% $Mo_2C$ and 28.4 weight-% Ni.

The results in L.-M. Berger et al "Hartmetallähnliche Schichten gegen Verschleiß and Korrosion", Maschinenmarkt No. 8, 1996, for abrasion resistance tests according to ASTM G65-85 or of erosion tests with an open tribosystem of cermets and hard metals can't be transferred to the air foil bearing, as no third bodies (abrasives) are welcome or abrasives will impact in bearing surfaces in a aerodynamic foil bearing and of course are not there present, since particle in the size of the air film will cause damage and block the tribosystem.

The results of Skopp, A. and M. Woydt "Ceramic and Ceramic Composite Materials with Improved Friction and Wear Properties", Tribology Transactions, Vol. 38(2), 1995, p. 233-242 of the unlubricated tribological behaviour in air of self-mated TM10 ($R_{PK}$ of smooth rotating disks ~0.025 μm) sliding couples up to 800° C. and 3.68 m/s can't be taken into consideration, as they were achieved using a monolithic (Ti,Mo)(C,N) with a binder composed of 13% by weight of nickel and 2% by weight of molybdenum.

Magnélli-type phases of $(Ti,V)_nO_{2n-1}$ or $(W,Mo)_nO_{3n-1}$ are unsuited for temperatures in air above 400-450° C. as they reoxidize to the stoichiometric composition. This can be overcomed by the use of $Ti_{n-2}Cr_2O_{2n-1}$, with $6 \leq n \leq 9$, which is oxidatively stable up to 1000° C. and above.

The state-of-the-art for sliding materials for foil bearings, especially established by the PS30x-coatings, disclose wear rates limited to $10^{-5}$ mm$^3$/Nm.

SUMMARY OF INVENTION

The present invention relates to tribosystems of foil bearings with a first structural component part and a second structural component part which are in dry frictional contact without liquid lubricant and/or lubricating grease and/or solid lubricants with one another, such that it can operate reliably without difficulty also at high temperatures up to 1000° C. under high-speeds-high-temperatures with wear rates below $10^{-6}$ mm$^3$/Nm associated with PV-values of greater 1 MPa× m/s.

According to the invention a tribosystem for radial and axial foil bearings is provided which includes a first structural component part and a second structural component part interacting with the first one. Between the two structural component parts a dry frictional contact with in directional sliding friction may be produced which allows the forming of an air film. An essential factor for the wearless operation of this tribosystem is that the surface exposed to the frictional contact of at least one structural component part, namely the first structural component part and/or the second interacting structural component part comprises at least partly metallic bound (Ti,Mo)(C,N), $Ti_{n-2}Cr_2O_{2n-1}$, with $6 \leq n \leq 9$ and/or solid solutions of $TiO_2$—$Cr_2O_3$.

$Ti_{n-2}Cr_2O_{2n-1}$, with $6 \leq n \leq 9$, form distinct phases with planar oxygen defects and represents a solid solution of substoichiometric $TiO_2$ as well as $Cr_2O_3$ and not a mixture of two components/phases. A favoured spray powder for the atmospheric plasma sprayed (APS) coatings in FIGS. 1 and 2 was composed mainly of $Cr_2Ti_8O_{15}$ and $Cr_{0.46}Ti_{0.54}O_{1.77}$, but $Cr_{0.15}Ti_{0.85}O_{1.925}$, $CrTi_2O_5$, $Cr_2Ti_2O_7$ and $Cr_2TiO_5$ could also be detected.

Preferably the metallic bound (Ti,Mo)(C,N) contains 1 to 20% by atom chromium. The oligo-element chromium improves the oxidation resistance of the (Ti,Mo)(C,N) at a temperature above 800° C. for continuous operation of long-term applications, since Mo becomes volatile as $MoO_2$ and $MoO_3$. The chromium content should not exceed 20% by atom Cr (related to the cations Ti, Mo and Cr). The C:N relation of the anions ranges between 9:1 and 6:4.

Another preferable alternative envisages that 1 to 20% by atom niobe are comprised.

The metallic binder is preferably selected from the group consisting of nickel, chromium, cobalt, molybdane and niobe. The binder may be contained within a weight range of 6 to 35%.

Preferably one of the structural component parts, namely the first structural component part or the second structural interacting component part may contain a monolithic material of (Ti,MO)(C,N) or may completely formed of it.

Cermets composed of (Ti,Mo)(C,N) for example can be transformed at temperatures above 700° C. by means of rolling/milling directly to foils, which is new, thus avoiding a coating. The mechanical properties of (Ti,Mo)(C,N) bonded with 15-30% by weight of NiMo allow also the manufacturing of a monolithic shaft. Monolithic shafts and foils become therefore bifunctional joining together both tribological and mechanical properties.

The thermal diffusivities K of nickel-base alloys are at room temperature $K_{RT}$=2.7 [mm$^2$/s] and increase to 800° C. to $K_{800}$=4.5 [m$^2$/s]. Those of (Ti,Mo)(C,N) depends from the binder content, but remain quasi uninfluenced from temperature at K ~3.90 [m$^2$/s], which in the same order of magnitude. Thus, the heat flux generated by friction will not be deteriorated by the (Ti,Mo)(C,N) coating.

The future application of cobalt-based alloys for operating temperatures at 816° C., like Haynes 188 (UNS R30188; UNS=Unified Numbering System) with 31-36.5% cobalt or Haynes HS25 (UNS R30605; ~2.4964) with 46-52% cobalt, will favor cobalt-based binders for (Ti,Mo)(C,N) in order to achieve a direct metallurgical bonding of the thermal sprayed coating to the substrate.

Another preferable alternative of the tribosystem according to the invention, envisages that the surface of the at least one structural component part is formed by a coating. The coating preferably contains $Ti_{n-2}Cr_2O_{2n-1}$ with $6 \leq n \leq 9$. Alternatively the coating may consist of a solid solution of $TiO_2$—$Cr_2O_3$. The coating preferably has a thickness of at least 1 μm.

As to the deposition of the coating no restriction are imposed, so that all suited methods known in the prior art are applicable. Exemplified the physical vapor deposition (PVD), the chemical vapor deposition (CVD) or the thermal spraying (APS) are mentioned.

In a further preferable embodiment between the coated structural component part and its coating a compensation-layer for the compensation of thermal tensions may be provided.

If one of the structural component part is coated with the prementioned materials or is formed as monolithic part of this material, the corresponding structural component part may be coated with alumina. The alumina advantageously has a purity of more than 97%. by weight and a grain size $d_{90}$<1 μm.

Fine grained alumina runs with low wear against (Ti,Mo)(C,N) and $Ti_{n-2}Cr_2O_{2n-1}$. Due to a significant mismatch of linear thermal dilatation, elastic modulus and diffusivity vis-à-vis the crystallographic orientation, the polycrystal is very sensitive to residual tensile stresses generated by a heat flux (frictional heat flux) penetration into the surface, when the grains have a grain size above 5 μm. This can be overcomed with fine grained alumina polycrystals. Alumina with grain sizes below 1 μm reduces the force, which can be generated by one crystal in one direction due to thermal dilatation.

According to the invention the use of metallic bound (Ti, Mo)(C,N), $Ti_{n-2}Cr_2O_{2n-1}$ where $6 \leq n \leq 9$, and/or a solid solution of $TiO_2$—$Cr_2O_3$ is provided for improving the wear resistance of radial and axial foil bearings. To this end the mentioned materials may be used as well for the monolithic formation of the structural component parts as for their coating.

BRIEF DESCRIPTION OF DRAWINGS

The inventive subject matter will be explained in detail by means of the following examples and the drawings without being restricted to the thus described special embodiments.

DETAILED DESCRIPTION

Example

Figure 1:
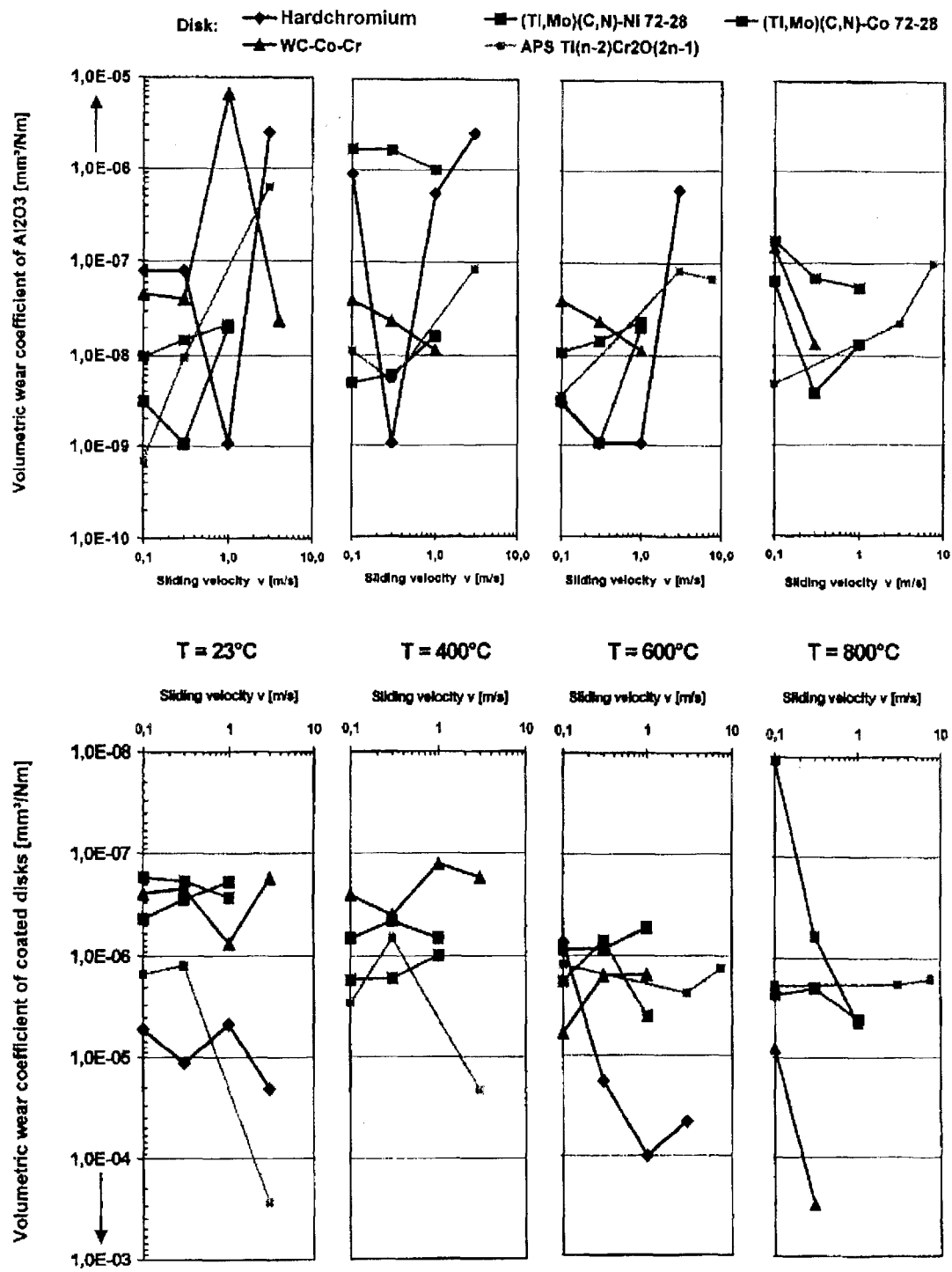
FIG. 1 shows in graphs the wear coefficient for different temperatures of thermally sprayed rotating disks against stationary specimen of sintered alumina (99.7%) under unlubricated dry sliding conditions ($F_N$=10 N and s=5.000 m).

The tribological selection of (Ti,Mo)(C,N) or $Ti_{n-2}Cr_2O_{2n-1}$ depends from the operating conditions of the foil bearings. The results in FIG. 1 were elaborated in a tribometer described in M. Woydt, K.-H. Habig, "High Temperature Tribology of Ceramics", Tribology International, Vol. 22, No. 2 (1989), S. 75-88. FIG. 1 presents the wear rate separated of stationary specimen (bearing shell) and rotating specimen (shaft) as function of sliding speed (up to 7 m/s) at four different ambient temperatures compared to WC—CoCr and hard chromium.

It is clearly visible, that the $Ti_{n-2}Cr_2O_{2n-1}$ coating, even with a quite elevated roughness of $R_{pK}$ ~0.61 µm, runs best with low wear rates above 600° C. and 1 m/s associated with wear rates of the alumina below $10^{-7}$ mm$^3$/Nm. In any case at 800° C., tungsten carbide (WC with 14 wt.-% CoCr, WC-10Co4Cr, $R_{pK}$ ~0.13 µm) coating cannot be applied due to excessive wear related to volatile $WO_3$. The nickel bonded (Ti,Mo)(C,N)-28Ni coating with $R_{pK}$ ~0.339 µm is more wear resistant than the cobalt bonded (Ti,Mo)(C,N)-29Co with $R_{pK}$ ~0.21 µm. The wear rates presented in FIG. 1 can be further lowered by reducing the surface roughness of the rotating samples (shaft) down to $R_{pK}$<0.03 µm.

The PxV-values presented in table 1 were calculated from the test results determined in the high-temperature tribometer in M. Woydt, K.-H. Habig, "High Temperature Tribology of Ceramics", Tribology International, Vol. 22, No. 2 (1989), S. 75-88 shown in FIG. 1. The individual PV-values of the (Ti,Mo) (C,N)-couples depend from the sliding velocity. In consequence, the range of PV-values in table 1 at each temperature covers the sliding velocities between 0.03 m/s≦v≦6 m/s.

TABLE 1

PxV-Values of unlubricated sliding couples (ε = overlap ratio of contacting surfaces)

| Sliding couple | | PxV-value [MPaxm/s] for 0.03 m/s ≦ v ≦ 6 m/s | | |
|---|---|---|---|---|
| Stationary (shell; ε = 100%) | Rotating (shaft; ε << 100%) | 22° C. | 400° C. | 800° C. |
| $Al_2O_3$ (99.7% purity) | (Ti, Mo) (C, N)-29Co (HVOF) | 40-120 | 20-60 | |
| (Ti, Mo) (C, N)-15NiMo (TM10) | (Ti, Mo)(C, N)-15NiMo (TM10) · RPK ~0,025 µm | 4-50 | 1-35 | 10-100 |
| INX-750 | PS304 | 1,7 | 2,94* | 0,63 |
| $Al_2O_3$ (99.4% purity) | PS300 | 2,88 | 3,25 | 11,6+ |

*500° C.; +650° C.; data from C. Dellacorte "The effect of counter-face on the tribological performance of a high temperature solid lubricant composite from 22 to 650°, NASA TM-107183, 1996 for PS30x calculated from NASA test results using 4,91N and 1 m/s; A. Skopp and M. Woydt,"Ceramic and Ceramic Composite Materials with Improved Friction and Wear Properties", Tribology Transactions, Vol. 38(2), 1995, p. 233-242 and Woydt, M., A. Skopp, I. Dörfel and K. Wittke, "Wear engineering oxides/Anti-wear oxides", Tribology Transactions, Vol. 42, 1999, No. 1, p. 21-31 and WEAR 218 (1998) 84-95.

Figure 3:
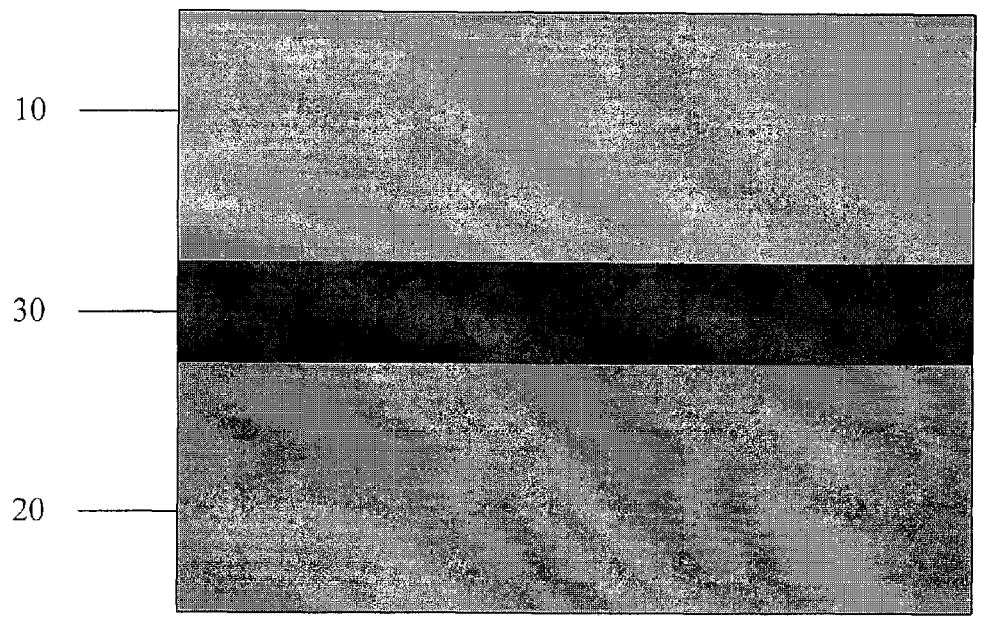
FIG. 3 shows a tribosystem prior to a formation of an air film according to an exemplary embodiment of the present invention.

FIG. 3 shows a tribosystem prior to a formation of an air film according to an exemplary embodiment of the present invention. The tribosystem may be used for axial and radial foil bearings. The tribosystem may include a first structural component part 10, a second structural component part 20 that interacts with the first structural component part 10, and a dry frictional unidirectional sliding contact 30. As the tribosystem may be used for axial and radial foil bearings, the first part 10 may be, for example, a bearing shell, a foil, etc. while the second part 20 may be, for example, a bearing shaft. The sliding contact 30 may contain at least partially (Ti,Mo)(C,N), $Ti_{n-2}Cr_2O_{2n-1}$ where 6≦n≦9, and solid solution of $TiO_2$—$Cr_2O_3$.

Figure 4:
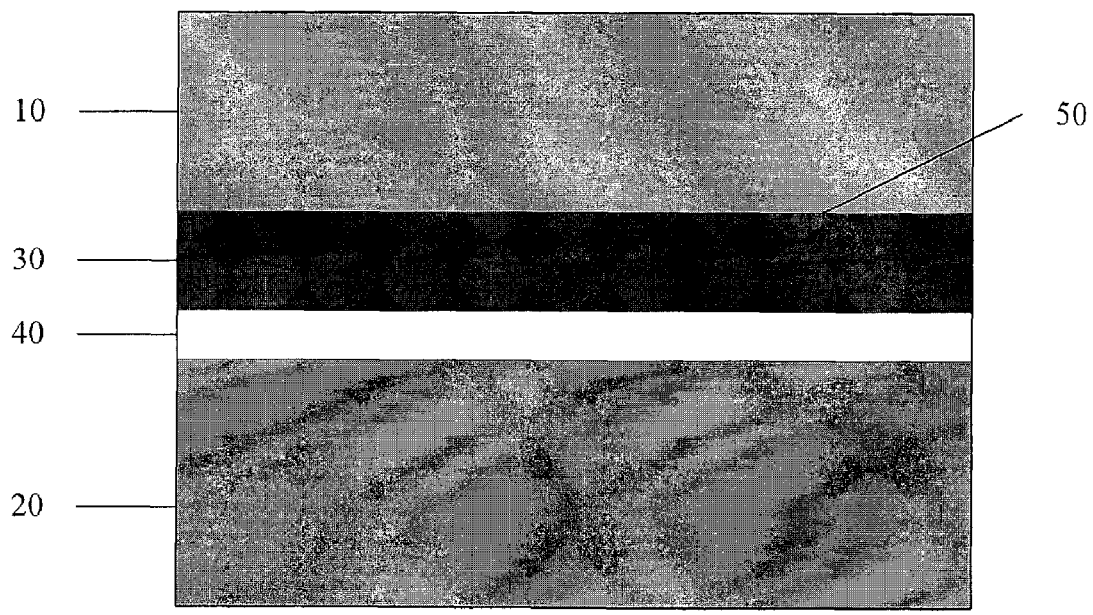
FIG. 4 shows the tribosystem of FIG. 3 subsequent to the formation of the air film according to an exemplary embodiment of the present invention.

FIG. 4 shows the tribosystem of FIG. 3 subsequent to the formation of the air film according to an exemplary embodiment of the present invention. When a shaft of an axial or radial foil bearing is spinning beyond a predetermined speed, an air film 40 may be generated that separates the first structural component part 10 from the second structural component part 20. Furthermore, it should be noted that a compensation layer 50 may be disposed as an intermediary between the first part 10 and the sliding contact 30, for example, to compensate thermal tensions.

FIG. 1, underlines by means of the wear results, which were measured over a sliding speed with more than two orders of magnitude, that a material may not be suited at low speeds (v<0.3 m/s), though it presents at higher speeds low wear (v>3 m/s) and inverse.

The self-start torque of the rotor represents another criteria for selection of the sliding couples mainly characterized by the coefficient of friction at a given temperature. The maximum acceptable coefficient of friction for the sliding couple depends for example from the design dimensions and should be below of 0.4, preferred 0.3.

Figure 2:
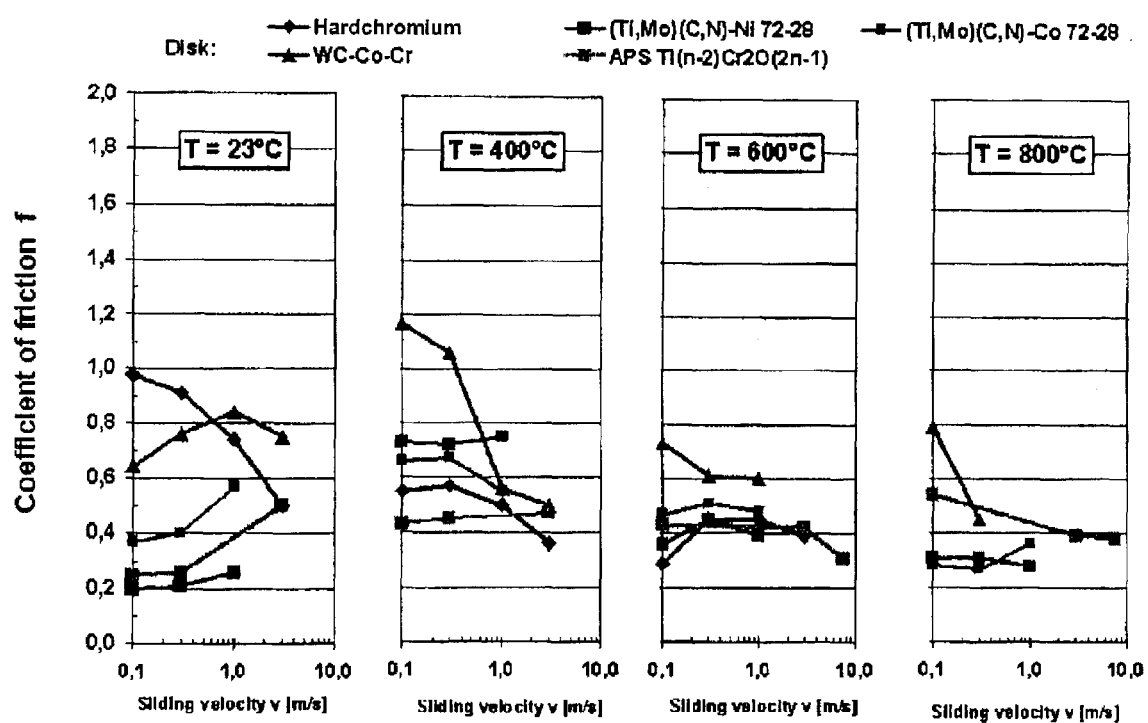
FIG. 2 illustrates in graphs the friction coefficients of thermally sprayed rotating disks against stationary specimen of sintered alumina (99.7%) under unlubricated dry sliding conditions ($F_N$=10 N and s=5.000 m).

The FIG. 2 presents coefficient of friction under dry friction corresponding to the wear rates in FIG. 1. The (Ti,Mo) (C,N) coatings display a favorable friction behavior.

It is noted, that the prior art related to cutting tools does not mention friction data.

The invention claimed is:

1. A tribosystem for radial and axial foil bearings, comprising:
a first structural component part; and a second structural component part interacting with the first part, the first and second parts being in a dry frictional unidirectional sliding contact with one another until an air film is formed, wherein a surface of at least one of the first and second parts being exposed to the dry frictional contact contains at least partly at least one of a metallic bound (Ti,Mo)(C,N), $Ti_{n-2}Cr_2O_{2n-1}$ with $6 \leq n \leq 9$ and solid solution of $TiO_2$—$Cr_2O_3$, and wherein when a rotational speed of the second part exceeds a predetermined speed, air pushes the first part away from the second part, thereby creating the air film.

2. The tribosystem according to claim 1, wherein the metallic bound (Ti,MO)(C,N) contains 1 to 20% by atom of chromium.

3. The tribosystem according to claim 1, wherein the metallic bound (Ti,Mo)(C,N) contains 1 to 20% by atom of niobe.

4. The tribosystem according to claim 1, wherein a metallic binder for the metallic bound (Ti,Mo)(C,N) and $Ti_{n-2}Cr_2O_{2n-1}$ is selected of the group consisting of nickel, chromium, cobalt, niobe, and molybdenum.

5. The tribosystem according to claim 4, wherein the metallic binder is 6 to 35% by weight of the metallic bound.

6. The tribosystem according to claim 1, wherein at least one of first and second parts comprises a monolithic material of metallic bound (Ti,Mo)(C,N) or is composed of it.

7. The tribosystem according to claim 1, wherein the surface of the at least one of the first and second parts is a coating.

8. The tribosystem according to claim 7, wherein the coating contains $Ti_{n-2}Cr_2O_{2n-1}$ with $6 \leq n \leq 9$.

9. The tribosystem according to claim 7, wherein coating contains solid solutions of $TiO_2$—$Cr_2O_3$.

10. The tribosystem according to claim 7, wherein the coating has a thickness of at least 1 µm.

11. The tribosystem according to claim 7, wherein the coating is deposited by one of a physical vapor deposition (PVD), a chemical vapor deposition (CVD) and a thermal spraying (APS) and High Velocity Oxygen Fuel (HVOF).

12. The tribosystem according to claim 7, wherein an intermediate layer is arranged between the coated part and the coating to compensate thermal tensions is arranged.

13. The tribosystem according to claim 1, wherein one of the first and second parts is coated with at least one of $Ti_{n-2}Cr_2O_{2n-1}$ with $6 \leq n \leq 9$, the solid solution of $TiO_2$—$Cr_2O_3$ and other structural component part as monolithic part consists of metallic bound (Ti,Mo)(C,N).

14. The tribosystem according to claim 1, wherein one of the first and second parts is coated with alumina.

15. The tribosystem according to claim 14, wherein the alumina has 97% by weight of purity.

16. The tribosystem according to claim 14, wherein the alumina has a grain size of $d_{90}<1$ µm.

17. The tribosystem according to claim 1, wherein the first part is a bearing shell.

18. The tribosystem according to claim 1, wherein the first part is a foil.

19. The tribosystem according to claim 1, wherein the second part is a bearing shaft.

* * * * *